United States Patent [19]

Shurman et al.

[11] Patent Number: 5,417,403
[45] Date of Patent: May 23, 1995

[54] CAPTURED RING AND THREADED ARMATURE SOLENOID VALVE

[75] Inventors: Rodney M. Shurman; Harry L. Wilson; David M. Rix, all of Columbus; John D. Crofts, Edinburgh; Brett I. Barnhart, Franklin; Alan B. Slachter, Columbus, all of Ind.

[73] Assignee: Cummins Engine Company, Inc., Columbus, Ind.

[21] Appl. No.: 181,461

[22] Filed: Jan. 14, 1994

[51] Int. Cl.⁶ ............................................. F16K 31/06
[52] U.S. Cl. ................................ 251/129.16; 251/129.18
[58] Field of Search ....................... 251/129.16, 129.18

[56] References Cited

U.S. PATENT DOCUMENTS

| | | | |
|---|---|---|---|
| 2,331,503 | 10/1943 | Ray | 251/129.16 X |
| 2,697,581 | 12/1954 | Ray | |
| 2,820,604 | 1/1958 | Ray | |
| 3,144,047 | 8/1964 | Tjaden | 251/129.16 X |
| 3,368,791 | 2/1968 | Wells | |
| 3,726,505 | 4/1973 | Williams | |
| 4,515,343 | 5/1985 | Pischinger et al. | |
| 4,588,163 | 5/1986 | Christensen | |
| 4,678,000 | 7/1987 | Kushida | |
| 4,678,160 | 7/1987 | Yamada et al. | 251/129.16 X |
| 4,777,915 | 10/1988 | Bonvallet | |
| 4,869,462 | 9/1989 | Logie et al. | 251/129.16 |
| 4,893,645 | 1/1990 | Augustinas et al. | |
| 4,905,960 | 3/1990 | Barnhart et al. | |
| 5,009,389 | 4/1991 | Kawamura | |
| 5,014,963 | 5/1991 | Nakayama et al. | |
| 5,029,807 | 7/1991 | Fuchs | |
| 5,064,166 | 11/1991 | Schechter | |
| 5,170,766 | 12/1992 | Haas et al. | |

FOREIGN PATENT DOCUMENTS

1222156  6/1960  France .

*Primary Examiner*—Arnold Rosenthal
*Attorney, Agent, or Firm*—Sixbey, Friedman, Leedom & Ferguson

[57] ABSTRACT

A solenoid valve is disclosed including a valve housing having a central bore and a valve seat, a valve element movable between an open position allowing fluid to pass through said valve seat and a closed position in sealing engagement with said valve seat, a valve operator for moving the valve element between the open and closed positions including a reciprocating armature plunger member extending through the bore and an armature secured to the armature plunger, a valve adjustment for adjustably mounting the valve element relative to the valve operator for permitting adjustment to within an acceptable tolerance of a predetermined distance between the valve element and the valve seat when the valve element is in its open position without creating a path of leakage when the valve element is in its closed position. A valve adjustment securing mechanism is provided for securing the armature to an armature end of the armature plunger and a load bearing insert is secured within the armature for bearing a load exerted by the armature plunger during reciprocation of the valve element to allow for surface contact during the valve operation without surface wear.

17 Claims, 6 Drawing Sheets

CAPTURED RING AND THREADED ARMATURE SOLENOID VALVE

TECHNICAL FIELD OF THE INVENTION

The present invention relates to fluid valves and more particularly, to a solenoid operated valve for an internal combustion engine having a simplified fastening means at the armature end of the valve structure to secure an entire valve assembly.

BACKGROUND OF THE INVENTION

The use of solenoid operated two-way valves in internal combustion engines is well known in the art and, more particularly, valves of this type are known to be used to control the flow of fuel into a timing chamber of an electronically controlled unit injector to permit control of both the quantity and timing of fuel injected into the internal combustion engine.

U.S. Pat. No. 4,431,160 issued to Burt et al. discloses an electrically operated valve for use in unit injectors. The '160 valve includes a cup shaped valve element universally mounted on a stem operator for movement between open and closed positions. A spring element biases the operator toward the valve open position. An armature mounted on the stem operator opposite the valve element is selectively attracted toward the stator of a solenoid to cause the valve element to move to its closed position whenever the solenoid coil is energized. Valves of the type disclosed in the '160 patent are required to operate at very high speed (fully opened and closed in 2.5 seconds) and must operate to block fluid at very high pressure (25–30,000 psi). To achieve this very high speed, the '160 cup shaped valve element must be arranged close to the valve seat as possible while providing adequate flow volume capacity. Such requirements necessitate extremely accurate positioning of the valve element relative to its valve seal.

When closed, valves of the type disclosed in '160 patent must create a very tight seal and thus the valve element is mounted by a self-aligning assembly. To allow for the accurate adjustment noted above, the self-aligning assembly includes a nut threadingly engaged with the stem operator so as to properly position the valve element. The nut includes an upper spherically shaped surface which is in constant contact with a conically shaped lower surface of the cup shaped valve element. The axial spacing between the valve element and the valve seat defines the stroke length of the valve and it is critical that this spacing be maintained at a predetermined optimum value. Fluctuation in this spacing of as little as 0.002 inches can affect the metering and timing of the injector and may eventually result in unacceptable performance of the injector, necessitating expensive repair. This fluctuation arises due to repeated impacts caused by reciprocation of the valve element between its open and closed positions. Therefore, it is essential that the nut, which retains the cup-shaped valve element of the valve, be fixed in its pre-determined optimum position and that this position be maintained throughout the life of the injector. In the above mentioned U.S. Pat. No. 4,431,160, it is the internal threads which are relied upon to act on the nut to hold the nut in place. This, however, has not been found to be reliable due to the above mentioned constant reciprocation of the cap and nut. During this constant reciprocation, the valve will vibrate, which, in turn, will cause the adjustment nut to slip or rotate, thereby deviating from the preset optimum position which may result in failure of the valve and costly repairs.

Figure 6:
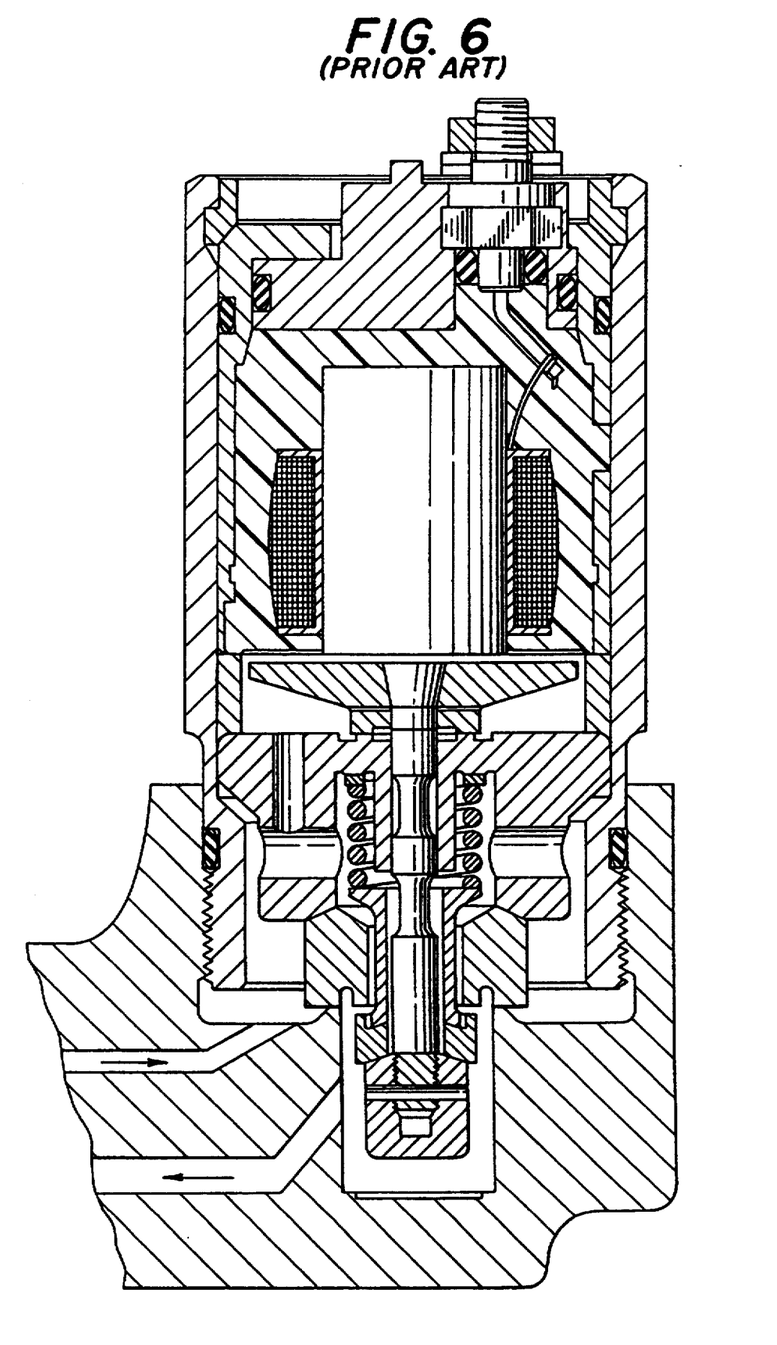
FIG. 6 is a cross sectional elevational view of the injector assembly previously described as prior art.

In an attempt to overcome the above noted shortcomings, U.S Pat. No. 4,905,960 issued to Barnhart et al. discloses a valve stroke adjustment locking mechanism comprising a valve seat having an axially extending bore therethrough and a seating surface, as shown in FIG. 6. A valve operator is provided having an elongated member which is reciprocable between a first open position and a second closed position. The elongated member includes a threaded end portion which extends from the valve seat for accommodating a valve assembly which is provided with a top portion forming a sealing face and a bottom portion having a central opening adapted to receive the threaded end portion of the elongated member. A closed end nut threadingly engages the threaded end portion of the elongated member and contacts the valve assembly for positioning the sealing surface at a predetermined spacing from the seating surface. A transverse hole is then electromechanically discharge machined transversely through the closed end nut and the threaded end portion of said piston member and a pressure fit pin is forced into the hole to rigidly fix the closed end nut relative to the elongated member in order to maintain the predetermined spacing without forming any paths of leakage. However, this valve requires a threaded joint and loctite process for attaching the nut on the high pressure side of the valve. Further, the valve stroke cannot be readily adjusted nor can the assembly be disassembled after the pin has been press fit therein.

Testing of this design has shown adjusting nut retaining torque to be a function of fluid pressure where retaining torque deterioration becomes more pronounced as fluid pressure is increased. Locating the adjustment nut in the high pressure area is the primary cause of the loose nut problem encountered on this prior art design.

It is evident that here is a need for a simplified fastening and adjustment mechanism which will both accurately and reliably position a fluid valve closure element in a predetermined optimum position, and do so without resulting in any leakage of fluid from within the assembly. Furthermore, there is a need for a fastening mechanism which will provide for easier construction of a solenoid valve assembly resulting in a lower cost of manufacture.

SUMMARY OF THE INVENTION

In view of the foregoing, it is an object of the present invention to provide a simplified solenoid valve assembly that provides for easy construction of the valve, a reduction in production cost and an elimination of the need for adhesives to hold parts in place.

It is a further object of the present invention to provide the fastening and adjustment mechanism for a solenoid valve assembly at the armature end of the valve to eliminate the loose nut problems found in the prior art by securing the valve assembly in the low pressure area instead of the high pressure pocket of the injector body.

It is yet another object of the present invention to maintain valve performance specifications by utilizing a stroke shim made of non-magnetic material to ensure critical valve stroke length and to isolate the magnetic field generated by a solenoid coil from the mechanical valve components.

It is further an object of the present invention to enhance wear resistance and strength of the solenoid valve components to maintain the critical valve stroke setting by providing adapters which are formed to fit within the armature disc and act as the load bearing element during operation of the solenoid valve.

These, as well as other objects of the present invention are achieved by a solenoid valve comprising a valve seat having an axially extending bore therethrough, a seating surface, an armature housing and an armature disc. An armature plunger is extended through the axial bore and is reciprocal between first and second positions corresponding to the opened and closed positions of the valve. A valve element is provided which is movable between the opened position, allowing fluid to pass between the valve seat and the valve element and the closed position, sealing the valve element against the valve seat. The armature plunger is connected to the valve element to :move this element between the opened and closed positions by way of a solenoid. In the first embodiment of the invention, the armature plunger extends axially through the valve seat bore and comprises an annular groove at the armature end of the solenoid valve assembly. The armature disc attaches to the valve assembly using an armature insert which is form fitted with the armature disc and an annular retaining ring which fits securely into the aforementioned annular groove located on the armature plunger. The annular retaining ring supports the armature insert and holds the solenoid valve assembly together. The armature insert is needed because the armature disc material does not have the wear resistance or strength necessary to be the load bearing surface for the annular retaining ring. A stroke shim is inserted between the armature housing which is adjacent to the valve seat and the armature disc to maintain a critical valve stroke length. The stroke shim comprises a slotted opening to allow its insertion around the armature plunger and is formed from a non-magnetic material to isolate the magnetic field generated by a solenoid coil from the mechanical valve components in order to maintain the critical valve performance specifications.

In the second embodiment of the invention, the armature plunger extends axially through the valve seat bore and comprises threads at the armature end of the solenoid valve assembly. The armature disc is fastened to the valve assembly using an adapter which is threadingly attached to the armature plunger. The face of the adapter is hardened where contact is made between the adapter and the armature housing. The hardened face allows for surface contact during solenoid valve operation without surface wear causing a change in valve stroke setting. The armature disc is secure to the adapter by a thread means and a powdered metal technology. The adapter is necessary due to the ductile nature of the armature disc. These simplified solenoid valve assembly designs provide for easy construction of the valve and allows the valve stroke adjustment to be placed in a low pressure area eliminating a loose nut problem found in prior solenoid valves where the adjustment was located in a high pressure area.

DETAILED DESCRIPTION OF PREFERRED EMBODIMENTS

Figure 1:
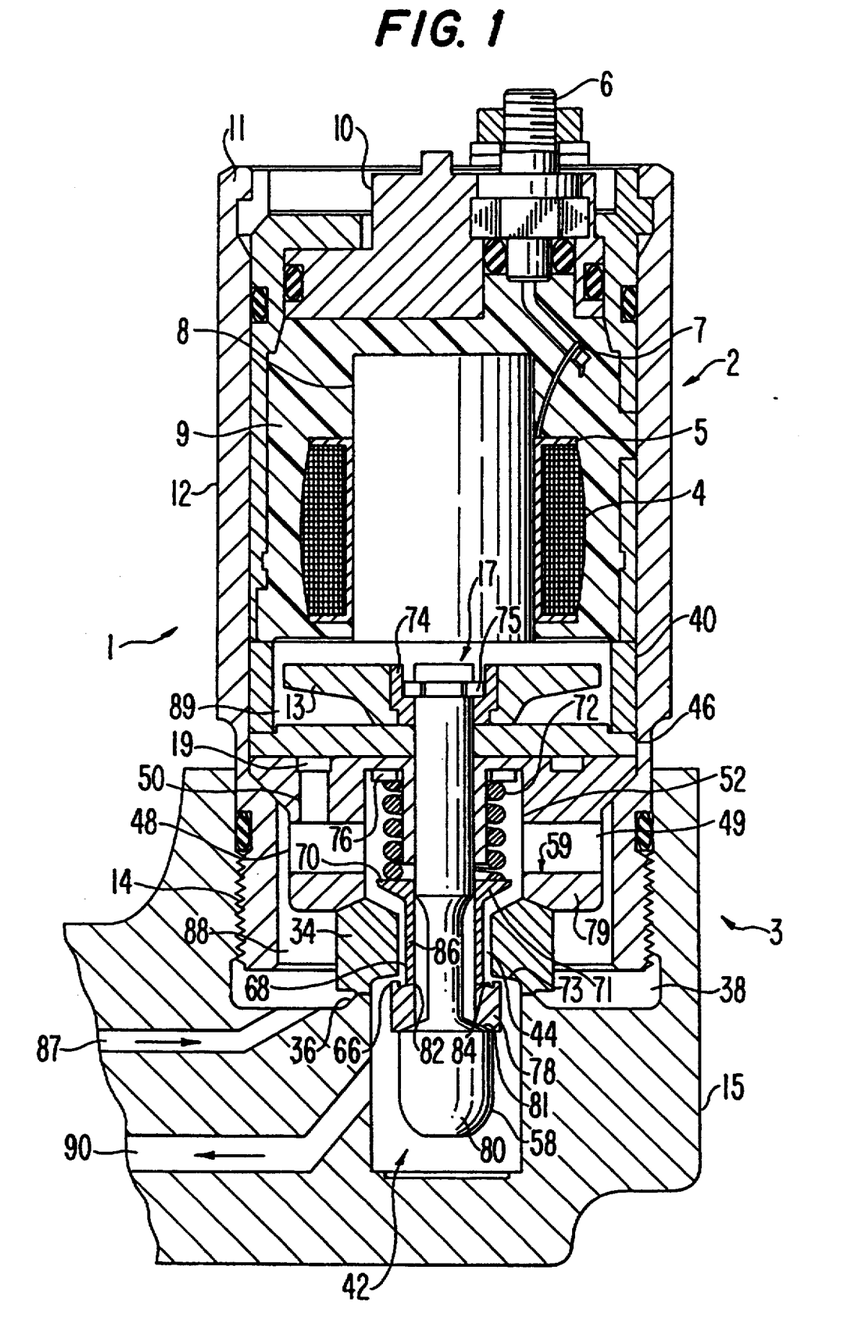
FIG. 1 is a cross-sectional elevational view of the injector assembly in the open condition in accordance with a preferred embodiment of the present invention.

FIG. 1 of the drawings illustrates a solenoid operated valve 1 formed of generally two sections. The first being a stator 2 illustrated in the upper section of FIG. 1 and the other being a mechanical valve assembly 3, shown in the lower section of FIG. 1 and independently in FIGS. 2 and 5. The stator 2 is of the conventional form set forth above in the prior art and therefore will be only discussed briefly herein. The stator 2 includes a coil 4 encircling a spool 5. Electrical energization of coil 4 is supplied through element 6 and line 7 to the coil 4. The spool 5 circumscribes a laminate core 8 and is encased in an epoxy packing 9. Element 6 is secured within the plate 10 and securing ring 11 further secures the entire assembly within the housing 12. In operation, energization of the coil 4 creates a magnetic field which attracts an armature 13 of the mechanical valve assembly 3 to selectively move the valve from an open condition shown in FIG. 1, to a closed condition.

The housing 12 includes a threaded end portion 14 which is threadingly received within the injection apparatus 15. The threaded end portion 14 of the housing 12 accommodates the mechanical valve assembly 3. When the housing 12 is inserted within the injection apparatus 15, a valve seat 34 of the mechanical valve assembly 3 abuts an annular ridge 36 provided in a receiving bore 38 of the injection apparatus 15. In doing so, the mechanical valve assembly 3 is forced against spacer 40 which maintains the armature 13 spaced from the stator.

Embodied in the mechanical valve assembly 3 are, in accordance with a first embodiment of the present invention a captured ring solenoid operated valve 42 and a threaded armature solenoid operated valve 82, in accordance with a second embodiment of the present :invention. The mechanical valve 3 includes the previously mentioned valve seat 34 having an axial bore 44 extending therethrough. An armature housing 79 abuts the valve seat 34. This armature housing 79 includes flow passages 48, 49, and 50 and has an axial bore 52 extending coaxially with the axial bore 44. Each of the bores 44 and 52 receive a stem operator in the form of an armature plunger 80 to which the armature 13 of the mechanical valve assembly 3 is secured.

The mechanical valve assembly 3 shown in FIG. 1 includes an armature plunger 80 of one-piece design with an acorn nut shape on the high pressure end of the valve structure. A valve spring spacer 70 and an intermediately positioned hollow shaped valve disc 78 having an annular circumferential sealing face 66 are concentrically located about the armature plunger 80. An end 68 of the valve spring spacer 70 extends outwardly from the axial bore 44 of the valve seat 34, while the other end 71 of the valve spring spacer 70 extends within the axial bore 52 of the armature housing 79. A spring 72 is maintained in abutment with the end 71 of the valve spring spacer 70 so as to resiliently bias the valve in the opened condition, as shown in FIG. 1. A spring shim 76 engages the spring 72 opposite the valve disc spacer 70 and sits within the axial bore 44 abutting the armature housing 79.

In order to ensure complete circumferential contact between the seating surface 73 of the valve seat 34 and the annular sealing face 66, the valve assembly 3 is provided with a self-aligning means. This self-aligning means is formed between the acorn shaped end of the armature plunger 80, the cup-shaped valve disc 78, and the valve spring spacer 70. The cup-shaped valve disc 78 is rotatably and slidably positioned between the acorn shaped end of the armature plunger 80 and the valve spring spacer 70. The bottom of the cup-shaped valve spring 78 is provided with a conically shaped outer surface 81 which insures a continuous line of contact between itself and the surface of the acorn-shaped end of the armature plunger 80 and an inner portion 82 of the bottom of the cup-shaped valve-disc 78 includes a contact surface 84 which forms a continuous line contact with the lower surface 86 of the valve disc spacer 70.

Referring now to the fuel flow within the solenoid valve assembly 6 in FIG. 1, a fuel supply line 87 supplies fuel to an accumulation chamber 88 within a lower portion of the housing 24. The fuel may then flow into the valve assembly through the flow passages 48 and 49. The flow passage 50 is provided between the flow passage 48 and the armature cavity 19 to neutralize the pressure therebetween so as to allow for the free movement of the armature 13. When the mechanical valve assembly 3 is in the opened condition as shown in FIG. 1, the fuel will be permitted to flow outward through the spacing provided between the valve seat 34 and the sealing face 66 and through the output line 90 to the timing chamber of the injection apparatus.

Figure 2:
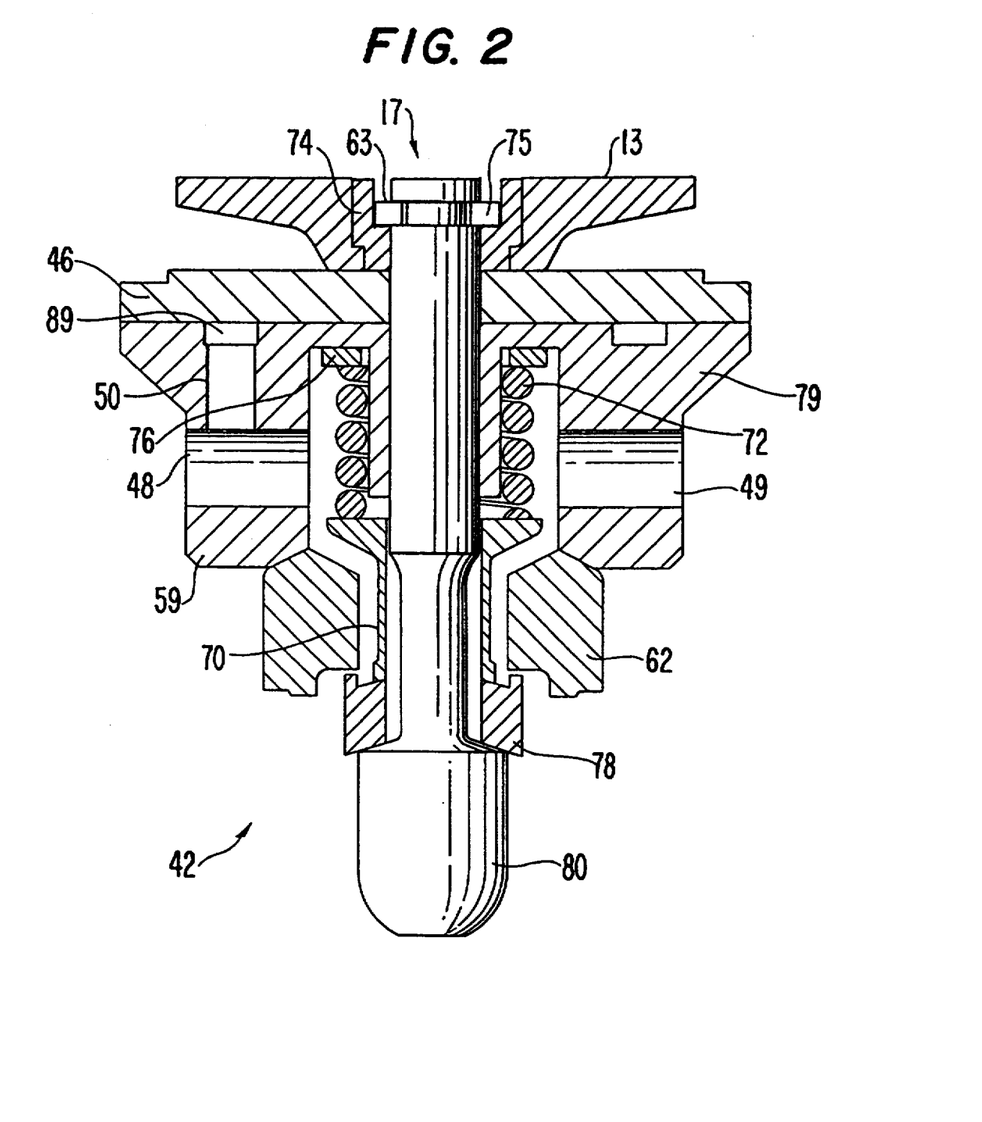
FIG. 2 is a cross-sectional elevational view of the valve portion of the injector assembly in the open condition in accordance with the preferred embodiment of the present invention.

FIG. 2 illustrates the first embodiment of the invention noted above as the captured ring solenoid operated valve 42. Positioned above the armature housing 79 is the armature 13, an armature insert 74, an annular ring 75 and a stroke shim 46. The armature insert 74 is formed to fit concentrically within the armature 13. When attaching the armature 13 to the armature plunger 80, the armature insert 74 and the armature 13 are pressed together to form an assembly. The armature 13 and the armature insert 74 then are concentrically positioned about the armature plunger 80 with the narrow end of the armature 13 directly abutting the stroke shim 46. The two piece assembly is necessary since the armature material necessary to be compatible with the solenoid does not have the wear resistance and strength properties required to be the load bearing surface for the annular ring 75. Only the armature insert 74 in the aforementioned two-piece assembly engages the armature plunger 80 directly.

At the opposite end of the acorn-shaped armature plunger 80, namely at the armature end of the mechanical valve assembly 3, is the fastening mechanism 17 comprising an annular groove 63. An annular ring 75 is circumferentially located about the armature plunger 80 within the annular groove 63. The armature insert 74 rests directly below the annular ring 75 and thus, acts as the load bearing surface during valve operation. It is the annular ring 75 which holds the entire captured ring solenoid valve assembly 42 together. Locating the annular groove 63 on the armature end of the solenoid valve allows the assembled portion of the valve to operate in a low pressure environment as compared to that of the prior art.

Figure 3:
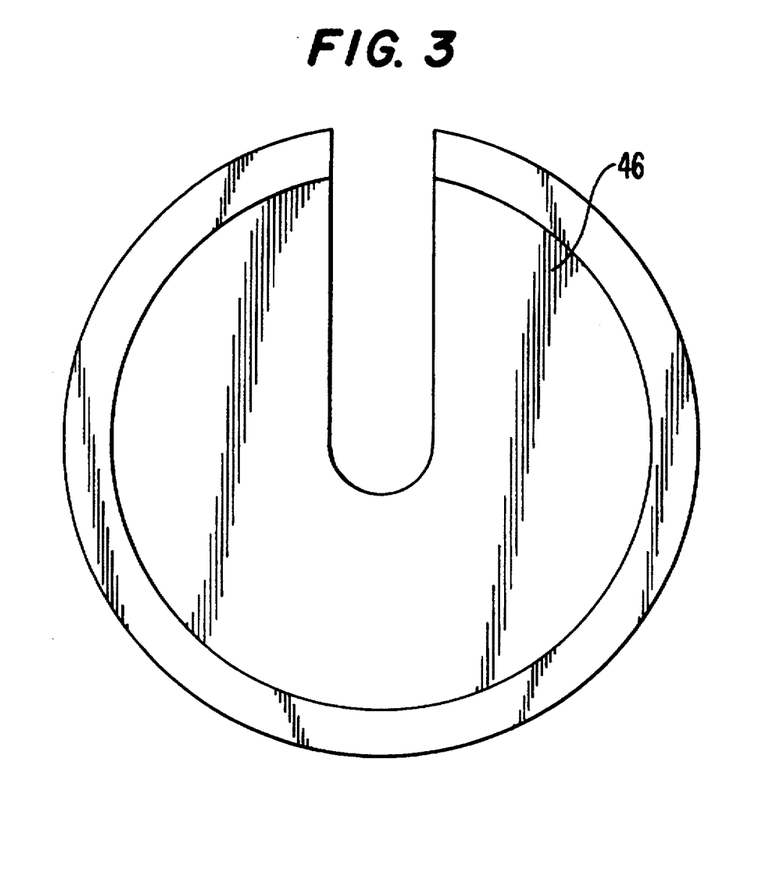
FIG. 3 is a top view of the stroke shim used in the valve portion of the injector assembly in accordance with the preferred embodiment of the present invention.

The stroke shim 46 is concentrically located about the armature plunger 80 and fits securely between the armature housing 79 and the two-piece armature insert 74 and armature 13 combination. A top-view of the stroke shim 46 design is shown in FIG. 3. The stroke shim 46 is a one-piece design with a circumferential groove on the outer perimeter of the shim's top side. The spaces 40 in the solenoid valve body 1 fit within the groove on the face of the shim 46. Also, the shim is made of a non-magnetic material to isolate the magnetic field generated by the coil from the components of the mechanical valve assembly 3. The stroke shim 46 has a slotted opening, as shown in FIG. 3, which allows the shim to be inserted between the armature housing 79 and the two-piece armature insert 74 and armature 13 combination after the annular ring 75 is inserted into the annular groove 63 and contained by the armature assembly. The valve stroke of the solenoid valve assembly 42 is set by the stroke shim 46. The shims are classified per thickness to allow the critical valve stroke setting to be maintained. That is, the thickness of the stroke shim 46 dictates the size of the opening between the annular sealing face 66 and the valve seat 34.

Figure 4:
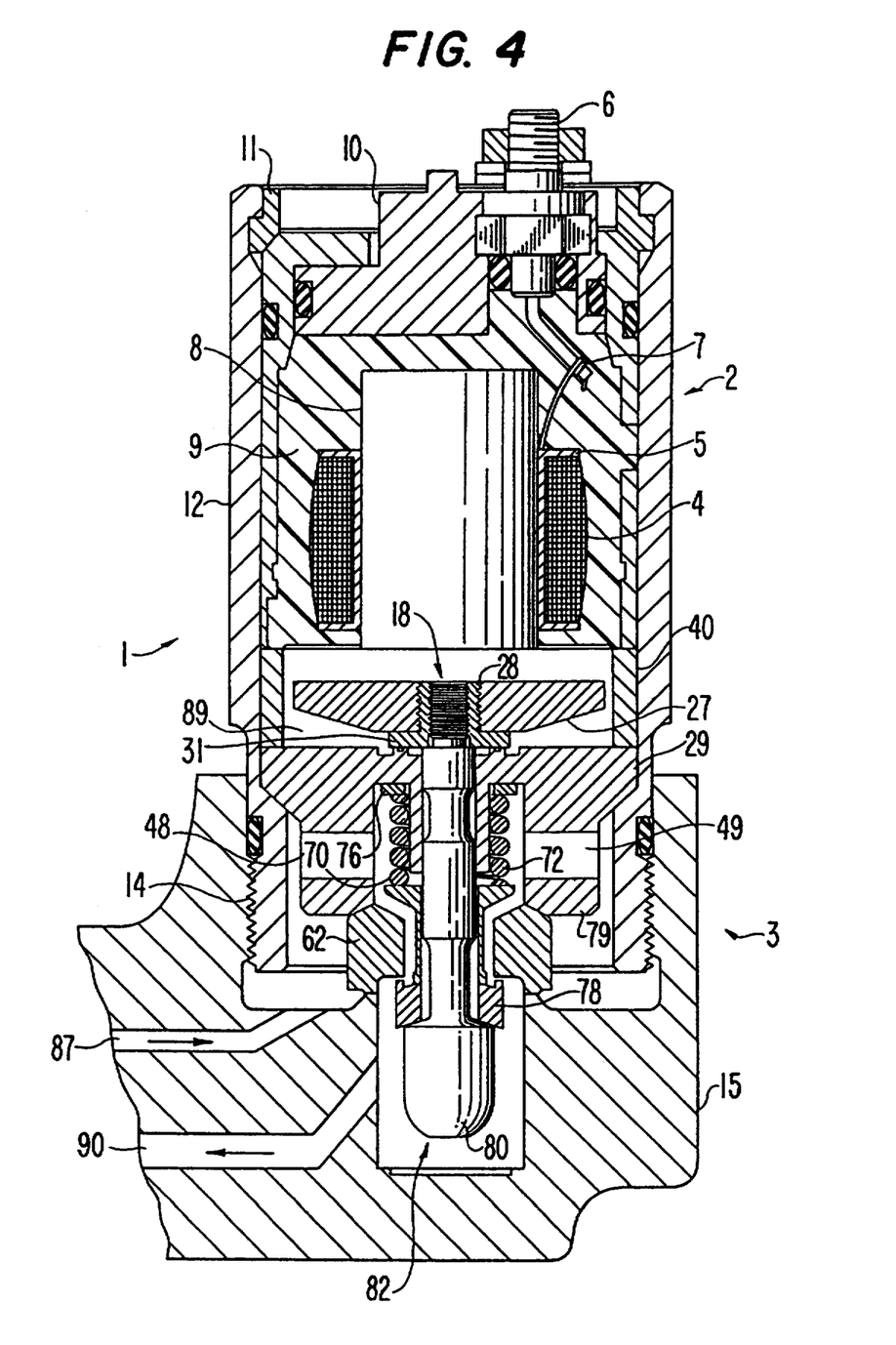
FIG. 4 is a cross-sectional elevational view of the injector assembly in the open position in accordance with an alternative embodiment of the present invention.
Figure 5:
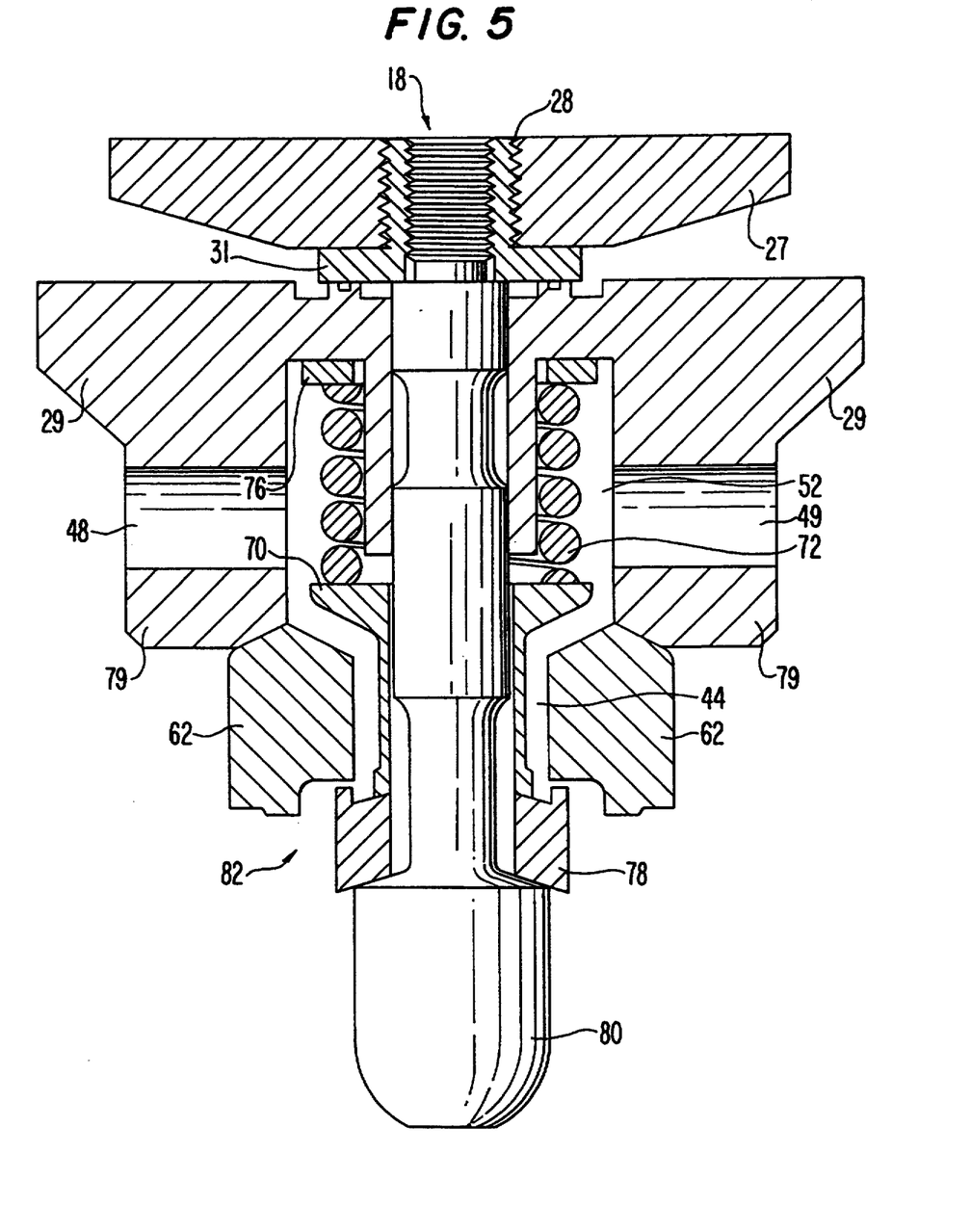
FIG. 5 is a cross-sectional elevational view of the valve portion of the injector assembly in the open condition in accordance with the alternative embodiment of the present invention.

An alternative embodiment of the present invention is shown in FIGS. 4 and 5 will now be described in detail. The entire solenoid valve assembly 1 is shown in FIG. 4 and a threaded armature assembly 82, which encompasses this embodiment of the invention, is shown in FIG. 5. The threaded armature assembly 82 includes components, like those discussed hereinabove, below the armature housing 29 with respect to the first embodiment. However, the armature housing 29, in the threaded armature design, illustrated in FIGS. 4 and 5, does not include a flow passage that extends perpendicular from the flow passage 48 in the armature housing. This passage is required in the first embodiment of the present invention to allow fluid pressure traveling in flow passage 48 to provide constant force on the stroke shim 46 to hold it against the spacers 40. Because the stroke shim 46 is not used in this embodiment, the provision for such a passage is not necessary.

Referring to FIG. 5, the armature plunger 80 extends through the axial bores 44 and 52 and includes threads on the end which receives armature disc 27 of the armature assembly 82. Providing the threads on the end of the plunger which receives the armature disk 27 allows the fastening joint 18 to operate in a low pressure area of the solenoid valve 1. Testing of the prior art valve, shown in FIG. 6, has shown that adjustment nut retaining torque is a function of pressure with retaining torque deterioration becoming more pronounced as pressure is increased. Locating the adjustment nut in the high pressure area as illustrated in FIG. 6 has been found to be the primary cause of the loose nut problem encountered on the current valve design.

The embodiment illustrated in FIGS. 4 and 5 comprises a threaded fastening design for attaching the armature disc 27 to the valve assembly. An armature adapter 31 is concentrically located around the end of the armature plunger 80 and is threadingly attached thereon. The adapter 31 is provided such that the armature disc 27 can be reliably fastened to the armature plunger 80. The face of the armature adapter 31 is hardened where contact is made between the adapter and armature housing 29. The hardened face allows for surface contact during valve operation without the two contacting surfaces wearing and causing a change in the critical valve stroke setting. The remaining portion of the adapter retains only core hardness to prevent thread breakage during assembly and operation. The adapter 31 is a necessary feature of the invention because the soft ductile nature of the silicon iron armature disc 27 makes it impossible to place the main fastening thread directly into the armature disc. Moreover, the critical valve stroke is set by the thickness of the face of the armature adapter 31 that abuts the armature housing 29.

The armature disc 27 is concentrically located around the armature adapter 31 and threadingly engages the same by way of threads 28. The threaded armature design allows the armature disc 27 to be formed around the adapter 31 by means of a powered metal technology or any other similar fastening means. Furthermore, the threaded armature disc design solves the loose nut problem of the prior art by removing the threaded joint from the high pressure pocket of the solenoid valve assembly 1.

While the invention has been described with reference to the preferred embodiments, it should be appreciated by those skilled in the art that the invention may be practiced otherwise than as specifically described herein without departing from the spirit and scope of the invention. It is therefore, understood that the spirit and scope of the invention be limited only by the appended claims.

INDUSTRIAL APPLICABILITY

The solenoid operated valve assembly may be employed in any environment where it is essential that a fastening mechanism not move the slightest amount relative to a reciprocating member to which it is applied. This particular fastening mechanism is even more appropriate with the existence of high pressures where the possibility of leakage is present. Application of this mechanism may be utilized in any environment where it is essential to regulate the flow of gas or a liquid from a source to a recipient.

What is claimed is:

1. A control valve comprising;
   a valve housing having a central bore and a valve seat;
   a valve element movable between an open position allowing fluid to pass through said seat and a closed position in sealing engagement with said valve seat;
   a valve operation means for moving said valve element between said open and closed positions including a reciprocating armature plunger member extending through said bore and an armature secured to said armature plunger;
   a valve stroke adjustment means for adjustably mounting said valve element relative to said valve operation means for permitting adjustment to within an acceptable tolerance of a predetermined distance between said valve element and said valve seat when said valve element is in its open position without creating a path of leakage when said valve element is in its closed position; said valve stroke adjustment means including a valve stroke shim positioned between said armature and said valve housing;
   an armature securing means for securing said armature to an armature end of said armature plunger; and
   a load bearing means secured within said armature for bearing a load exerted by said armature plunger during reciprocation of said valve element.

2. The control valve as defined in claim 1, wherein said valve operation means includes an electronically controlled solenoid.

3. The control valve as defined in claim 1, wherein said valve stroke shim is integrally formed with said load bearing means.

4. The control valve as defined in claim 1, wherein said load bearing means is an armature insert secured within said armature, said armature being secured to said armature plunger by way of said armature insert.

5. The control valve as defined in claim 4, wherein said armature insert is threadingly attached to said armature plunger.

6. The control valve as defined in claim 6, wherein a face of said armature insert is hardened where contact is made between said armature insert and said valve housing.

7. The control valve as defined in claim 6, wherein said armature is integrally formed with said armature insert by a powdered metal process.

8. The control valve as defined in claim 1, wherein said armature securing means includes an annular groove at the armature end of the said artnature plunger adjacent said armature insert.

9. The control valve as defined in claim 8, wherein said annular groove is adapted to receive an annular retaining ring for securing said armature relative to said operation means.

10. A valve stroke adjustment mechanism comprising;
    a valve housing having a central bore and a valve seat;
    a valve element movable between an open position allowing fluid to pass through said valve seat and a closed position in sealing engagement with said valve seat;
    a valve operation means for moving said valve element between said open and closed positions including a reciprocating armature plunger member extending through said bore and an artnature secured to said armature plunger;
    a valve stroke adjustment means for adjustably mounting said valve element relative to said valve operation means for permitting adjustment to within an acceptable tolerance of a predetermined distance between said valve element and said valve seat when said valve element is in its open position without creating a path of leakage when said valve element is in its closed position an armature securing means for securing said armature to an armature end of said armature plunger; and
    a load bearing means secured within said armature for bearing a load exerted by said armature plunger during reciprocation of said valve element;
    wherein said valve stroke adjustment means includes a stroke shim inserted between said valve housing and said armature for positioning said valve element in a predetermined position with respect to said valve seat when said valve element is in the open position.

11. The valve stroke adjustment mechanism as defined in claim 10, wherein a thickness of said stroke shim determines a valve stroke of said valve element.

12. The valve stroke adjustment mechanism as defined in claim 11, wherein said stroke shim comprises a slotted opening for receiving an elongated stem of said armature plunger.

13. The valve stroke adjustment mechanism as defined in claim 12, wherein said valve operation means includes an electronically controlled solenoid.

14. The valve stroke adjustment mechanism as defined in claim 13, wherein said stroke shim comprises a non-magnetic material for isolating a magnetic field generated by said electronically controlled solenoid.

15. The valve stroke adjustment mechanism as defined in claim 10, wherein said load bearing means is an armature insert secured within said armature, said armature being secured to said armature plunger by way of said armature insert.

16. The valve stroke adjustment mechanism as defined in claim 15, wherein said stroke shim is integrally formed with said armature insert.

17. The valve stroke adjustment mechanism as defined in claim 16, wherein a thickness of said stroke shim determines a valve stroke of said valve element.

* * * * *